United States Patent Office 3,151,122
Patented Sept. 29, 1964

3,151,122
PREPARATION OF N-ALKYL- AND N-CYCLO-ALKYLBIS (2-BENZOTHIAZOLESULFEN)AMIDES
Norman Karl Sundholm, Middlebury, Conn., assignor to United States Rubber Company, New York, N.Y., a corporation of New Jersey
No Drawing. Filed Aug. 31, 1961, Ser. No. 135,124
5 Claims. (Cl. 260—306.6)

This invention relates to a method for the preparation of N-alkyl- and N-cycloalkylbis(2-benzothiazolesulfen)-amides. Such compounds are useful as accelerators in the vulcanization of any of the recognized sulfur-vulcanizable rubbers, natural or synthetic. Further, they have the useful property of showing good resistance to scorch, that is, they have little tendency to cause incipient vulcanization of conventional rubber stocks during processing. An N-alkyl- or N-cycloalkylbis(2-benzothiazolesulfen)amide has greater scorch resistance than the corresponding mono-2-benzothiazolesulfenamide derived from the same primary amine.

According to the present invention, N-alkyl- and N-cycloalkylbis(2-benzothiazolesulfen)amides are prepared by treating the corresponding 2-benzothiazolesulfenamide under substantially anhydrous conditions with an acid having an ionization constant $K_a$ above $1 \times 10^{-3}$ at 25° C., as represented, without limitation, by the equation:

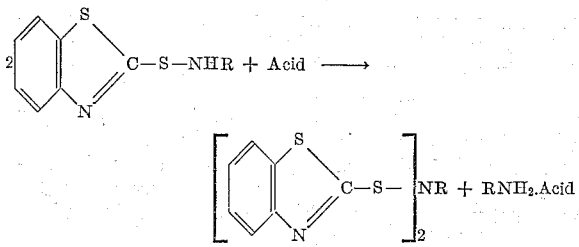

wherein R is selected from the group consisting of alkyl and cycloalkyl radicals.

The N-alkyl- and N-cycloalkylbis(2-benzothiazolesulfen)amides have been prepared by the reaction of 2-benzothiazolesulfenyl chloride with the corresponding alkyl or cycloalkyl primary amine, according to the teachings of U.S. Patent 2,873,277 and U.S. Patent 2,889,331. According to U.S. Patent 2,873,277, the primary amine and the sulfenyl chloride are added concurrently to a reaction zone in a 3:2 molar ratio. This requires the metering of the flow of both reactants. 2-benzothiazolesulfenyl chloride is prepared by the chlorination of 2-benzothiazolyl disulfide in a suitable organic liquid. When this is done on a commercial scale, a slurry, rather than a clear solution, is obtained which is difficult to meter properly. The present process obviates this difficulty as it does not employ the sulfenyl chloride. According to U.S. Patent 2,889,331, the primary amine is added to the sulfenyl chloride in a 3:2 molar ratio at a temperature in the range from about −40° to about 0° C. This requires extensive refrigeration which is not necessary in the present process.

As disclosed in U.S. Patent 2,860,142, N-alkyl- and N-cycloalkylbis(2-benzothiazolesulfen)amides can also be prepared by reacting the corresponding N-alkyl- or N-cycloalkyl-2-benzothiazolesulfenamide with acetic anhydride, propionic anhydride or butyric anhydride. For economic reasons, the mole of amine eliminated when two moles of the monosulfenamide are reacted to form one mole of the bis(sulfen)amide must be readily recoverable in high yield to be used in the preparation of more monosulfenamide. In the process of this invention, the amine is eliminated generally as a sparingly soluble, readily separable salt, which is obtained in near quantitative yield. The salt may be used as such in the preparation of the monosulfenamide, or the free amine can be readily recovered by simple treatment with caustic soda and distillation. In the process of U.S. Patent 2,860,142, the amine is eliminated as the soluble amide, which is more difficult to separate in good yield than the salt. The amide cannot be used in this form to prepare the monosulfenamide but must be hydrolyzed to release the free amine.

Carr, Smith and Alliger, Journal of Organic Chemistry, vol. 14, p. 926 (1949), state that thiazolesulfenamides are quickly decomposed by acidic substances in aqueous solution or in dry ether with the formation of thiazolyl disulfides and the amine salts of the acids used. They found that in several experiments using N-cyclohexyl-2-benzothiazolesulfenamide with hydrogen chloride in dry ether, a small amount of ether-soluble yellow oil was obtained, possibly 2-benzothiazolesulfenyl chloride, which decomposed rapidly at ordinary temperatures forming solid 2-benzothiazolyl disulfide.

According to the instant invention, it has been found that if the N-alkyl- or N-cycloalkyl-2-benzothiazolesulfenamide is treated with a controlled amount of acid and the reaction medium is anhydrous, the major product is not the disulfide but the corresponding bis(2-benzothiazolesulfen)amide. The amount of acid required is approximately one-half equivalent of acid for each mole of N-substituted 2-benzothiazolesulfenamide employed. The term "equivalent" is defined as the weight in grams of the substance which in its reaction corresponds to a gram-atom of hydrogen, or of hydroxyl, or half a gram-atom of oxygen, or a gram-atom of a univalent ion. For acids which are polybasic, like sulfuric, less than one-half mole would be required. It is not necessary to use exactly one-half equivalent of acid per mole of monosulfenamide, but as close to the stoichiometric amount as possible should be employed. The greater the deficiency or excess of acid, the poorer the scorch resistant properties of the product, since a deficiency would result in unchanged N-substituted 2-benzothiazolesulfenamide in the product and an excess would result in 2-benzothiazolyl disulfide in the product. Both of these compounds have less scorch resistance as accelerators than the N-substituted bis(2-benzothiazolesulfen)amide. In the case of acids which are monobasic, that is, those which have one equivalent per mole, the N-substituted 2-benzothiazole-sulfenamide and acid are employed in approximately a 2:1 molar ratio. Since a bis(2-benzothiazolesulfen)-amide cannot be derived from a secondary amine, it is necessary that the 2-benzothiazolesulfenamide employed in the process be derived from a primary amine. The 2-benzothiazolesulfenamides derived from primary amines are generally prepared by the oxidative condensation of 2-mercaptobenzothiazole and the corresponding amine with sodium hypochlorite. For example, N-tert-butyl-2-benzothiazolesulfenamide is prepared by this method in U.S. Patent 2,807,620.

Not all acids function satisfactorily in this reaction. Weak acids, exemplified by acetic acid which has an ionization constant $K_a$ at 25° C. of $1.75 \times 10^{-5}$, are not applicable. With acetic acid the major product is 2-benzothiazolyl disulfide, and the reaction which does take place is so sluggish at ordinary temperatures that heating is required to increase the rate. The acids employed in this process are those having an ionization constant $K_a$ above approximately $1 \times 10^{-3}$ at 25° C. or, in other terms, a p$K_a$ of less than 3 at 25° C. The acid employed must be in anhydrous form. Where polybasic acids are employed, it is preferred that the $K_a$ of each of the acid groups is above approximately $1 \times 10^{-3}$. Examples of suitable acids are hydrogen chloride, hydrogen bromide, 100% sulfuric acid, chloroacetic acid, bromoacetic acid, cyanoacetic acid, dichloroacetic acid, trichloroacetic acid, o-chlorobenzoic acid, o-bromobenzoic acid, o-nitrobenzoic acid and 3,5-dinitrobenzoic acid.

For ease and thoroughness of mixing, the reaction is best carried out in an anhydrous, inert organic solvent in which the 2-benzothiazolesulfenamide is soluble, such as benzene, toluene, solvent naphtha, chlorobenzene, carbon tetrachloride, methylene chloride, ethylene chloride, propylene chloride, mixed amyl chlorides, ethyl ether and dioxane, and mixtures of such solvents.

With the strong fast-reacting acids, such as hydrogen chloride and hydrogen bromide, it is the preferred procedure to progressively add the acid to the solution of the 2-benzothiazolesulfenamide. This suppresses at least one side reaction, the formation of the disulfide, which takes place when a 2-benzothiazolesulfenamide is added to a strong acid. With the weaker, slower reacting acids, such as chloroacetic acid, the order and manner of mixing the acid and 2-benzothiazolesulfenamide does not significantly affect the resulting product, although the desired reaction is probably favored to some minor extent by the above procedure.

The treatment of the N-substituted 2-benzothiazolesulfenamide may be carried out at a temperature of between —20° C. and 100° C., with the preferred temperature being between 15° C. and 40° C. The resulting N-substituted bis(2-benzothiazolesulfen)amide is best isolated by distillation of the solvent after removal of the amine salt by filtration or water extraction.

The following examples are given to illustrate the invention:

Example I

Dry hydrogen chloride was slowly passed into a stirred solution of 132 grams (0.50 mole) of N-cyclohexyl-2-benzothiazolesulfenamide in 850 ml. of dry benzene at 24–26° C. until the gain in weight was 9.1 grams (0.25 mole of hydrogen chloride). The addition time was about one-half hour. After completion of the addition, the mixture was stirred at 24–26° C. during one-half hour and then filtered. The residue was washed with two 100-ml. portions of benzene. The washings were added to the filtrate, and the benzene was removed to leave 106 grams of solid. Two-hour digestion of the solid with 220 ml. of acetone at room temperature followed by recrystallization from n-hexane with decolorizing charcoal treatment gave 53.7 grams of pure N-cyclohexylbis(2-benzothiazolesulfen)amide as colorless crystals melting at 133–134° C.

Example II

Dry hydrogen bromide was slowly passed into a stirred solution of 59.5 grams (0.25 mole) of N-tert-butyl-2-benzothiazolesulfenamide in 500 ml. of dry toluene at 24–26° C. until the gain in weight was 10.1 grams (0.125 mole of hydrogen bromide). The addition time was about 40 minutes. After completion of the addition, the mixture was stirred at 24–26° C. during 10 minutes and then filtered. The residue was washed with two 50-ml. portions of toluene. The washings were added to the filtrate, and the toluene was removed to leave 39 grams of solid. Recrystallization from n-hexane with decolorizing charcoal treatment gave 25.4 grams of pure N-tert-butyl-bis(2-benzothiazolesulfen)amide as colorless crystals melting at 143–144° C.

Example III

Dry hydrogen chloride was slowly passed into a stirred solution of 44.8 grams (0.20 mole) of N-isopropyl-2-benzothiazolesulfenamide in 250 ml. of dry methylene chloride at 24–26° C. until the gain in weight was 3.65 grams (0.10 mole of hydrogen chloride). The addition time was about one-half hour. The mixture was stirred for another half hour and then worked up as in Example II to give 30.0 grams of pure N-isopropylbis(2-benzothiazolesulfen)amide as colorless crystals melting at 106–107° C.

Example IV

A solution of 16.4 grams (0.10 mole) of trichloroacetic acid in 100 ml. of dry benzene was added during 70 minutes to a stirred solution of 47.6 grams (0.20 mole) of N-tert-butyl-2-benzothiazolesulfenamide in 300 ml. of dry benzene at 24–26° C. After completion of the addition, the mixture was stirred at 24–26° C. during 3 hours and worked up as in Example I. Twenty-five grams of pure N - tert - butylbis(2-benzothiazolesulfen)amide was obtained.

Example V

A solution of 11.9 grams (0.05 mole) of N-tert-butyl-2-benzothiazolesulfenamide and 2.36 grams (0.025 mole) of chloroacetic acid in 60 ml. of dry benzene was allowed to stand for 6 days at room temperature. The crude product obtained after the usual workup procedure was digested with water for 8 hours at room temperature, and then recrystallized from n-hexane and from ethanol with decolorizing charcoal treatment to give 3.2 grams of pure N-tert-butylbis(2-benzothiazolesulfen)amide.

Having thus described my invention, what I claim and desire to protect by Letters Patent is:

1. A method of preparing N-alkyl- and N-cycloalkyl-bis(2-benzothiazolesulfen)amides which comprises the treatment of a member of the group consisting or N-alkyl- and N-cycloalkyl-2-benzothiazolesulfenamides under substantially anhydrous conditions with an acid having an ionization constant $K_a$ above $1 \times 10^{-3}$, wherein approximately one-half equivalent of the acid is employed per mole of the 2-benzothiazolesulfenamide.

2. A method of preparing N-alkyl- and N-cycloalkyl-bis(2-benzothiazolesulfen)amides which comprises the treatment under substantially anhydrous conditions of the corresponding 2-benzothiazolesulfenamide with hydrogen chloride in approximately a 2:1 molar ratio.

3. A method of preparing N-isopropylbis(2-benzothiazolesulfen)amide which comprises the treatment under substantially anhydrous conditions of N-isopropyl-2-benzothiazolesulfenamide with hydrogen chloride in approximately a 2:1 molar ratio.

4. A method of preparing N-tert-butylbis(2-benzothiazolensulfen)amide which comprises the treatment under substantially anhydrous conditions of N-tert-butyl-2-benzothiazolesulfenamide with hydrogen chloride in approximately a 2:1 molar ratio.

5. A method of preparing N-cyclohexylbis(2-benzothiazolesulfen)amide which comprises the treatment under substantially anhydrous conditions of N-cyclohexyl-2-benzothiazole-sulfenamide with hydrogen chloride in approximately a 2:1 molar ratio.

References Cited in the file of this patent

UNITED STATES PATENTS

| 2,321,305 | Messer | June 8, 1943 |
| 2,860,142 | Conly | Nov. 11, 1958 |
| 2,889,331 | Sundholm | June 2, 1959 |

OTHER REFERENCES

Buckton et al.: Franchimont, others, Beilstein (Handbuch, 4th ed.), volume 2, pages 176, 181 (1920).

Carr et al.: J. Org. Chem., vol. 14, pages 921–34 (1949).